(12) United States Patent
Soni et al.

(10) Patent No.: US 9,915,167 B2
(45) Date of Patent: Mar. 13, 2018

(54) DETECTION OF DEFICIENT SENSORS IN A GAS TURBINE SYSTEM

(71) Applicant: ANSALDO ENERGIA SWITZERLAND AG, Baden (CH)

(72) Inventors: Sumit Soni, Jupiter, FL (US); John Thomas Cutright, Stuart, FL (US); Nicolas Demougeot, Stuart, FL (US)

(73) Assignee: ANSALDO ENERGIA SWITZERLAND AG (CH)

( * ) Notice: Subject to any disclaimer, the term of this patent is extended or adjusted under 35 U.S.C. 154(b) by 230 days.

(21) Appl. No.: 14/947,785

(22) Filed: Nov. 20, 2015

(65) Prior Publication Data
US 2017/0145851 A1 May 25, 2017

(51) Int. Cl.
| | |
|---|---|
| F02C 9/00 | (2006.01) |
| F01D 21/00 | (2006.01) |
| G01L 27/00 | (2006.01) |
| G01M 15/14 | (2006.01) |
| F01D 21/14 | (2006.01) |

(52) U.S. Cl.
CPC ............ *F01D 21/003* (2013.01); *F01D 21/14* (2013.01); *F02C 9/00* (2013.01); *G01L 27/007* (2013.01); *G01M 15/14* (2013.01); *F05D 2260/80* (2013.01); *F05D 2270/80* (2013.01)

(58) Field of Classification Search
CPC ..... F02C 9/00; F05D 2270/083; G01L 27/007
See application file for complete search history.

(56) References Cited

U.S. PATENT DOCUMENTS

| | | | | |
|---|---|---|---|---|
| 4,449,358 A | * | 5/1984 | Mani .......................... | F02C 9/00 60/39.25 |
| 4,848,096 A | * | 7/1989 | Funahashi ............. | F25B 49/005 62/126 |
| 5,665,899 A | * | 9/1997 | Willcox ................ | G01L 9/0075 73/1.63 |
| 6,684,163 B2 | * | 1/2004 | Antoine .................... | F02C 9/00 700/30 |
| 7,203,594 B2 | * | 4/2007 | Hasegawa ............. | F02D 41/222 701/114 |
| 7,603,222 B2 | * | 10/2009 | Wiseman ................ | F01D 17/24 701/100 |
| 8,701,420 B2 | * | 4/2014 | Nomura .................... | F02C 9/28 60/39.27 |
| 9,207,670 B2 | * | 12/2015 | Rud ........................ | G01D 18/00 |
| 2002/0143477 A1 | * | 10/2002 | Antoine .................... | F02C 9/00 702/34 |
| 2007/0199328 A1 | * | 8/2007 | Shah ........................ | F02C 9/28 60/740 |

(Continued)

*Primary Examiner* — David A Rogers
(74) *Attorney, Agent, or Firm* — Hovey Williams LLP

(57) ABSTRACT

Methods and systems for determining that a sensor, such as a pressure sensor, that provides feedback on one or more conditions of a gas turbine is deficient are provided. The amplitude of measurements from the sensor may be monitored in different frequency ranges in order to detect certain abnormal conditions of the gas turbine that require attention by the control system in one frequency range, and also, concurrently and/or separately, detect a sensor deficiency in another frequency range prior to actual failure of the sensor, at which time the failure may otherwise be noticeable in the first frequency range. This permits better detection of deficient sensors during operation of the gas turbine.

17 Claims, 7 Drawing Sheets

(56) References Cited

U.S. PATENT DOCUMENTS

| | | | |
|---|---|---|---|
| 2009/0125207 A1* | 5/2009 | Nomura | F02C 3/22 |
| | | | 701/100 |
| 2010/0169816 A1* | 7/2010 | Hammer | G05B 19/0428 |
| | | | 715/771 |
| 2011/0004390 A1* | 1/2011 | Nomura | F02C 9/28 |
| | | | 701/100 |
| 2012/0086502 A1* | 4/2012 | Smith | G01N 33/007 |
| | | | 327/530 |
| 2014/0076052 A1* | 3/2014 | Doller | B81C 99/005 |
| | | | 73/587 |

* cited by examiner

DETECTION OF DEFICIENT SENSORS IN A GAS TURBINE SYSTEM

TECHNICAL FIELD

The field of the invention relates to gas turbines and their associated control systems and sensors.

BACKGROUND OF THE INVENTION

Gas turbines operate to produce mechanical work or thrust, and are typically coupled to a generator for producing electricity. The drawing of electrical current from the generator causes a load to be applied to the gas turbine. This load is essentially a resistance that the gas turbine must overcome so that the generator maintains an electrical output.

Control systems are often used to regulate the operation of gas turbines. In operation, a control system may receive information about a variety of conditions such as, for example, pressures, temperatures, fuel flow rates, and engine frequencies, among others. In response, the control system can make adjustments to the inputs of the gas turbine engine to maintain desired performance.

Over time, sensors used in a gas turbine for monitoring turbine conditions, including pressure sensors, can become deficient (i.e., do not provide an accurate or reliable signal), and as a result, proper monitoring of the gas turbine becomes more difficult. It is preferable to detect the failure of sensors as early as possible, to avoid the possibility of the control system making decisions based on deficient sensor measurements or input from a failing sensor. Accordingly, an improved method of determining the health of a sensor in a gas turbine that addresses these issues, among others, is needed.

SUMMARY

This summary presents a high-level overview of various aspects of the invention and a selection of concepts that are further described below in the detailed description section of this disclosure. This summary is not intended to identify key or essential features of the claimed subject matter, nor is it intended to be used as an aid in isolation to determine the scope of the claimed subject matter. The scope of the invention is defined by the claims.

In brief, and at a high level, this disclosure describes, among other things, methods and systems for determining that a sensor, such as a pressure sensor, that provides signals to a control system of a gas turbine is deficient, or rather, is not operating correctly or reliably prior to actual failure of the sensor. In the example of a pressure sensor, the amplitude of the signal from the pressure sensor may be monitored in different frequency ranges of the signal in order to detect certain abnormal conditions of the gas turbine that may require attention, and also, concurrently and/or separately, monitor the pressure sensor for any indications of deficiency. By monitoring different frequency ranges of the sensor signal, a deficiency in the sensor may be detected prior to actual failure of the sensor, while still monitoring for particular abnormal conditions of the gas turbine. Various non-limiting embodiments that achieve this detection are described in detail herein.

In a first embodiment, a computer-implemented method, executed by one or more processors, for detecting deficient sensors in gas turbines is provided, in accordance with an embodiment of the present invention. The method comprises receiving pressure readings from a pressure sensor coupled to a gas turbine, monitoring a first frequency range of the pressure readings for abnormal conditions of the gas turbine, monitoring a second frequency range of the pressure readings for sensor failure indications, and determining either that the sensor failure indications are not present and that the monitoring for the abnormal conditions is being performed by a correctly operating sensor, or the sensor failure indications are present and that the monitoring for the abnormal conditions is being performed by a deficient sensor.

In a second embodiment, one or more computer-readable media having computer executable instructions embodied thereon that, when executed, perform a method for detecting deficient sensors in gas turbines is provided, in accordance with an embodiment of the present invention. The method comprises receiving signals from a sensor in a gas turbine, monitoring a first frequency range of the signals for abnormal conditions of the gas turbine, monitoring a second frequency range of the signals for sensor failure indications, and determining either that the sensor failure indications are not detected and the sensor is operating correctly, or the sensor failure indications are detected and the sensor is deficient. The abnormal conditions may comprise a first range of sensor readings in the first frequency range, and the sensor failure indications may comprise at least one of a minimum sensor reading in the second frequency range and a minimum difference between concurrent sensor readings in the first frequency range and in the second frequency range.

In a third embodiment, a system for detecting deficient sensors in gas turbines is provided, in accordance with an embodiment of the present invention. The system comprises a gas turbine having one or more combustors, a control system communicatively coupled to the gas turbine, and a sensor coupled to the gas turbine and communicatively coupled to the control system, the sensor sending signals to the control system. The control system may be configured to monitor a first frequency range of the signals for abnormal conditions of the gas turbine, monitor a second frequency range of the signals for sensor failure indications, and determine either that the sensor failure indications are not detected and the sensor is operating correctly, or the sensor failure indications are detected and the sensor is deficient. The abnormal conditions may comprise a first range of sensor readings in the first frequency range, the sensor failure indications may comprise a second range of sensor readings in the second frequency range, and the first frequency range may be higher than the second frequency range.

The methods and systems disclosed herein are discussed frequently in the context of pressure sensors; however, these methods and systems are applicable to any type of sensor in which different frequency ranges of the sensor signal may be monitored for changing conditions.

Abnormal conditions of the gas turbine may comprise any type of sensor signal or indication that may warrant reaction, adjustment, or identification by the control system of the gas turbine. One such example is flameout of the gas turbine, sometimes known as Lean Blowout (LBO). LBO can occur when the local fuel-to-air ratio in the reaction zone of the gas turbine falls below the lean flammability limit. In such a case, the flame is too lean to maintain stability, and begins to fluctuate, creating low frequency acoustic pulsations called LBO tones. Eventually, if such lean instability continues, the flame in one or more of the combustion chambers may get extinguished and the turbine will forcefully shutdown. Indications of LBO may be detected through a spike in pressure signals from a pressure sensor in a combustor, for example.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of the various embodiments of the present invention is described with specificity in this disclosure to meet statutory requirements. However, the description itself is not intended to limit the scope of invention. Rather, the claimed subject matter may be embodied in various other ways to include different features, components, elements, combinations, and/or steps similar to the ones described in this document, and in conjunction with other present and future technologies. Terms should not be interpreted as implying any particular order among or between various steps unless the stated order of steps is required. Many different arrangements of the various components depicted, as well as use of components not shown, are possible without departing from the scope of the claims.

At a high level, the present invention generally relates to systems and methods for detecting deficient sensors, such as pressure sensors, in a gas turbine system. More specifically, embodiments of the invention allow a control system of a gas turbine, which utilizes a sensor to receive signals and feedback related to the operation of the gas turbine, to detect both abnormal conditions of the gas turbine and sensor failure indications (i.e., indications of a deficient sensor) using the signals from the sensor prior to actual failure of the sensor. Embodiments allow this to be accomplished through monitoring of signals from the sensor in different frequency ranges for feedback that relates to either the abnormal conditions or the sensor failure indications, depending on the frequency range monitored for a given signal. Additionally, the frequency ranges, and parameters relating to certain indications in the frequency ranges, may be user-configurable, to allow such monitoring in differently configured gas turbine systems.

Figure 1:
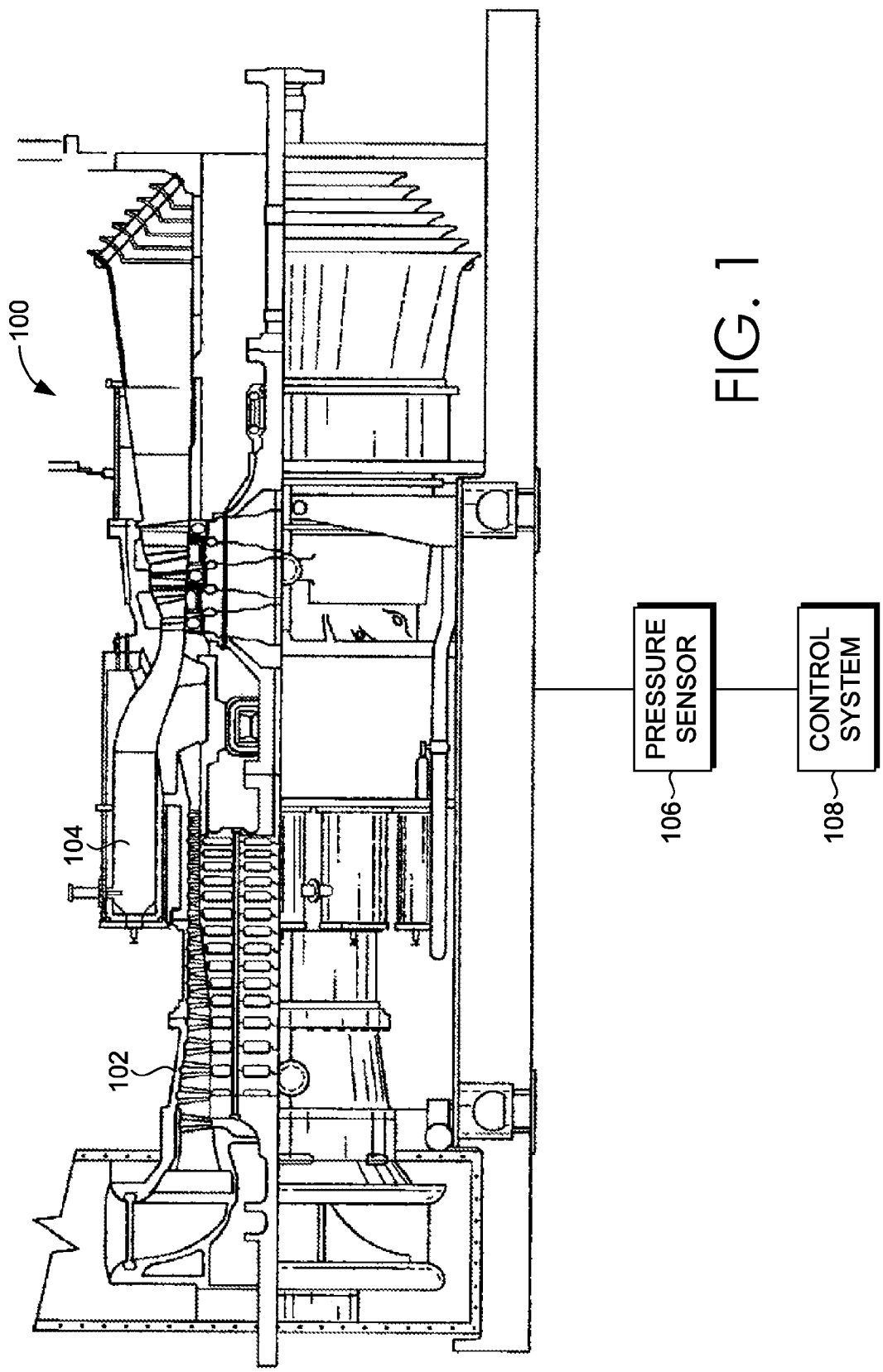
FIG. 1 is an exemplary system for detecting deficient sensors in a gas turbine, in accordance with an embodiment of the present invention.

Having described some general aspects of the invention, reference is now made to FIG. 1, which depicts an exemplary system 100 for detecting deficient sensors in a gas turbine, in accordance with an embodiment of the present invention. In FIG. 1, the system 100 includes a gas turbine 102 having one or more combustors 104, a pressure sensor 106 communicatively coupled to the gas turbine 102, and a control system 108 communicatively coupled to the pressure sensor 106 and to the gas turbine 102. The control system 108 may be used to monitor feedback, or rather, signals, from the pressure sensor 106, and use such feedback in controlling different aspects of the gas turbine 102. Other components of the system 100 are possible and contemplated; however, for clarity, only a few components are shown in FIG. 1. Additionally, the gas turbine 102 shown in FIG. 1 is merely exemplary, and other gas turbine designs are contemplated.

Figure 2A:
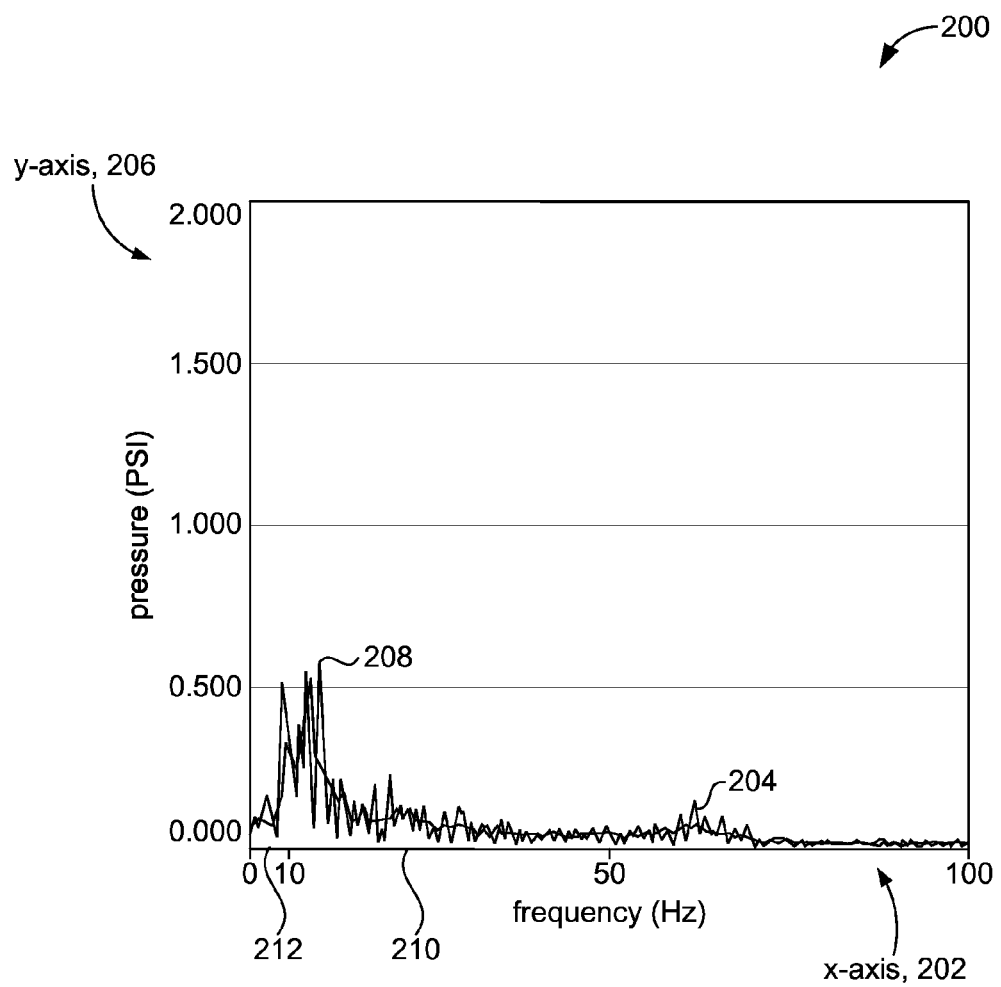
FIG. 2A is an exemplary graph indicating feedback from a properly operating pressure sensor coupled to a gas turbine, in accordance with an embodiment of the present invention.

Referring now to FIG. 2A, a graph 200 of a signal from a properly operating pressure sensor connected to a gas turbine is provided, in accordance with an embodiment of the present invention. As shown in FIG. 2A, the x-axis 202 of the graph represents various frequencies of a pressure signal 204 (i.e., a range of frequencies of the same pressure signal 204) from the pressure sensor, and the y-axis 206 represents the signal amplitude of the pressure signal 204 at the different frequencies. The curve of the pressure signal 204 is low at either end, with an elevated signal amplitude at point 208. A first frequency range 210, which for exemplary purposes is 10-50 Hz, is monitored for abnormal conditions of the gas turbine (e.g., a pressure spike related to LBO), which may be detected through predetermined activity of the signal amplitude within the first frequency range 210. A second frequency range 212, which for exemplary purposes is 0-10 Hz, is monitored for sensor failure indications, which may be detected through predetermined activity of the signal amplitude within the second frequency range 212. The predetermined activity may be any form of signal activity, including exceeding a minimum signal amplitude, receiving signals in a predetermined range of signal amplitudes, or another indication.

The first frequency range 210 may be selected to allow for monitoring of specific abnormal conditions of the gas turbine that require control system input, adjustment, identification, or reaction (e.g., a certain spike in signal amplitude of the pressure signal 204 that indicates a gas turbine malfunction or LBO). Monitoring of pressure readings outside of the first frequency range 210 may not normally be necessary or practical for detection of such abnormal conditions of the gas turbine, but readings outside of the first frequency range 210, such as in the second frequency range 212, may still provide useful indications of the health of the pressure sensor. In this respect, sensor failure indications may be detected in the second frequency range 212 prior to the pressure sensor becoming fully deficient, and affecting the readings in the first frequency range 210. As one example, when the signal amplitude of the pressure signal 204 spikes above a certain level in the second frequency range 212, the control system may identify a failing sensor, deactivate the sensor, and/or indicate that a repair or replacement of the sensor is needed.

Figure 2B:
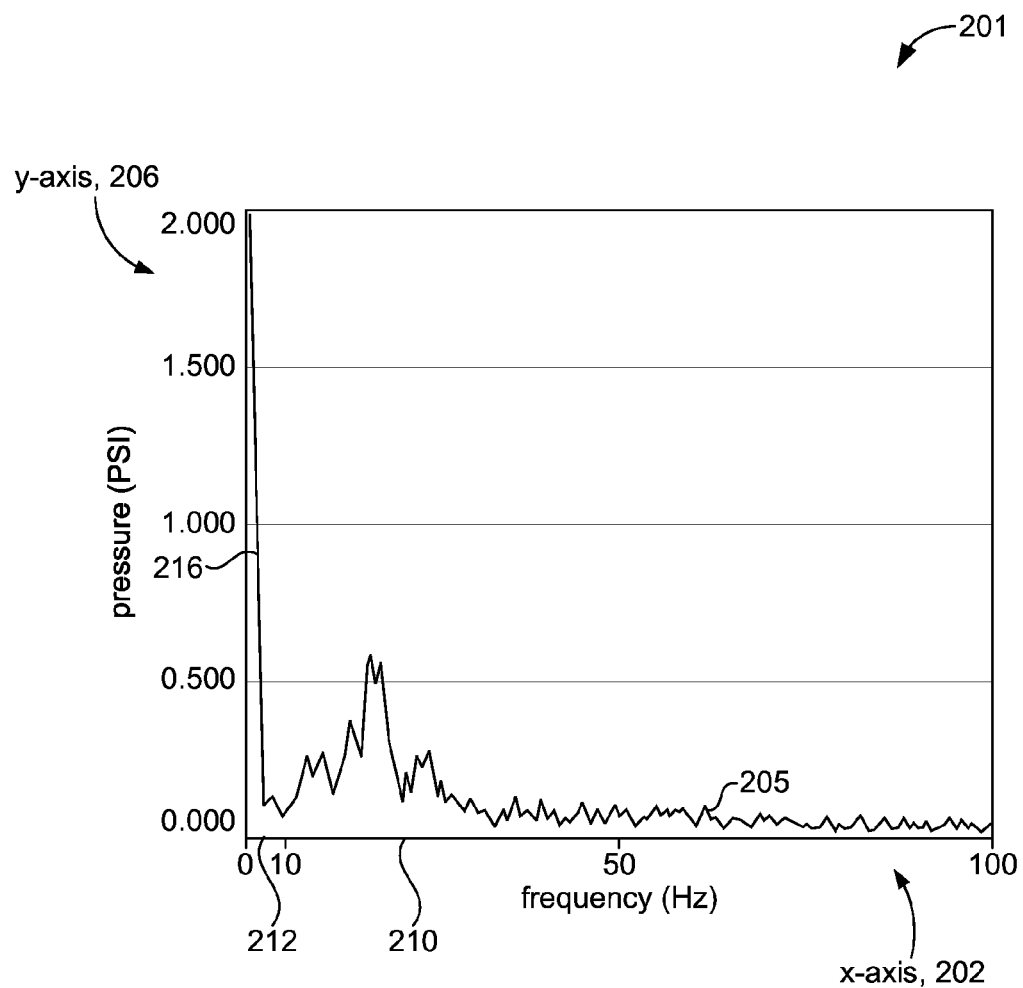
FIG. 2B is an exemplary graph indicating feedback from a deficient pressure sensor coupled to a gas turbine, in accordance with an embodiment of the present invention.

Referring now to FIG. 2B, a graph 201 of a pressure signal 205 with different signal amplitudes measured at different frequencies of the pressure signal 205 is provided, in accordance with an embodiment of the present invention.

The graph 201 in FIG. 2B shows the pressure signal 205, which is from a pressure sensor that is deficient or becoming deficient, as discussed herein.

Furthermore, in FIG. 2B, as discussed with respect to FIG. 2A, the first frequency range 210 is monitored for predetermined changes in the signal amplitude of the pressure signal 205 within the first frequency range 210, to identify abnormal conditions of the gas turbine which require reaction and adjustment by the control system. The second frequency range 212 is monitored for predetermined changes in the signal amplitude of the pressure signal 205 within the second frequency range 212, to identify sensor failure indications. The sensor failure indications may, once again, be at least one of a minimum signal amplitude of the pressure signal 205, detection of a signal amplitude within a certain range, and/or a relative difference between signal amplitudes in the first frequency range 210 and the second frequency range 212, depending on the desired configuration. Multiple configurations are possible and contemplated.

In FIG. 2B, a spike 216 in the signal amplitude of the pressure signal 205 in the second frequency range 212 is present. This spike 216 indicates that the associated pressure sensor is deficient, or becoming deficient. Identification of the failing pressure sensor in the second frequency range 212 allows repair or replacement of the pressure sensor before the readings in the first frequency range 210 become compromised or affected, which can otherwise lead to improper function by the control system of the gas turbine due to inaccurate or deficient feedback from the pressure sensor.

Figure 2C:
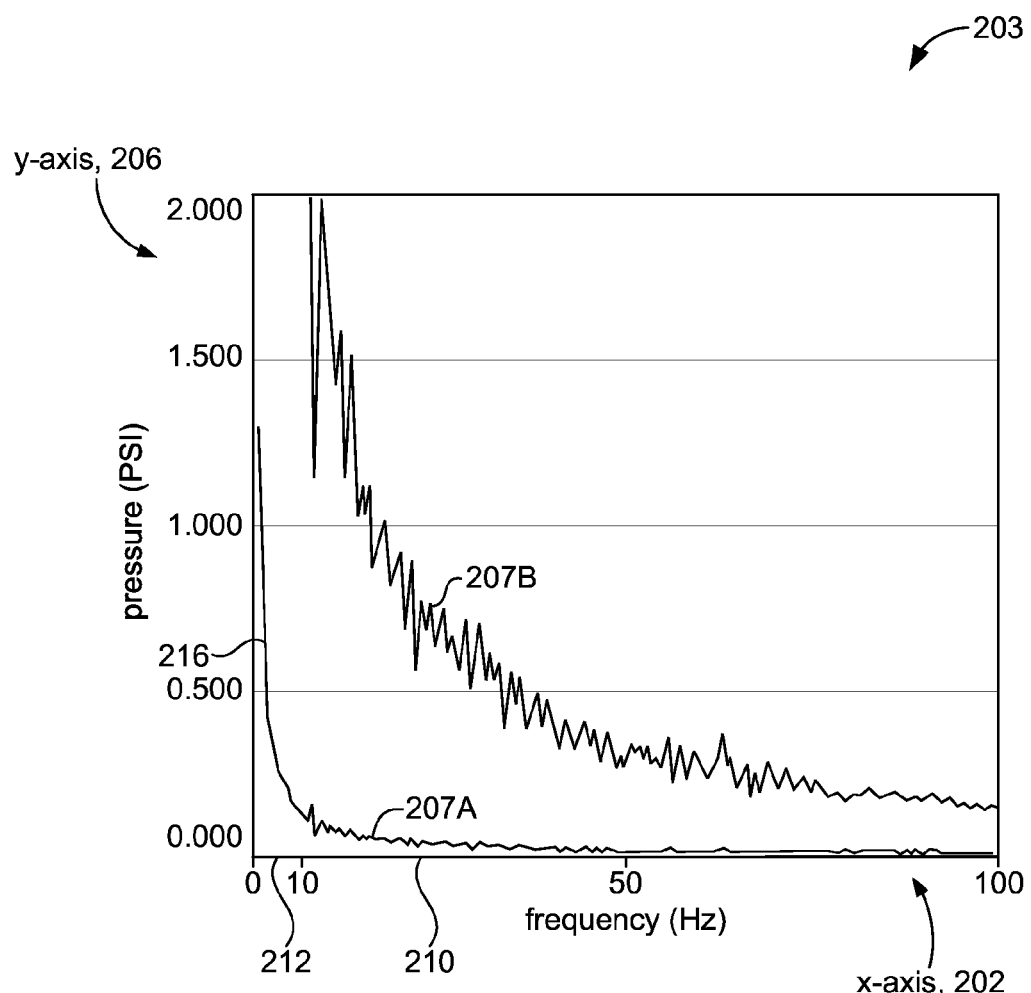
FIG. 2C is an exemplary graph indicating feedback from a failed pressure sensor coupled to a gas turbine, in accordance with an embodiment of the present invention.

Referring now to FIG. 2C, a graph of pressure signals 207A and 207B with signal amplitudes shown at various frequencies for a failed pressure sensor is provided, in accordance with an embodiment of the present invention. In FIG. 2C, as discussed with respect to FIG. 2B, the spike 216 in the signal amplitude of the pressure signal 207A is present. Additionally, the increased signal amplitude indicating failure of the pressure sensor is now detectible in both the first frequency range 210 and in the second frequency range 212 using the pressure signals 207A and 207B. This shows that the pressure sensor has failed completely. Monitoring of the second frequency range 212 may allow detection of this failure, and replacement or repair of the pressure sensor, before this state of feedback is reached.

Figure 3:
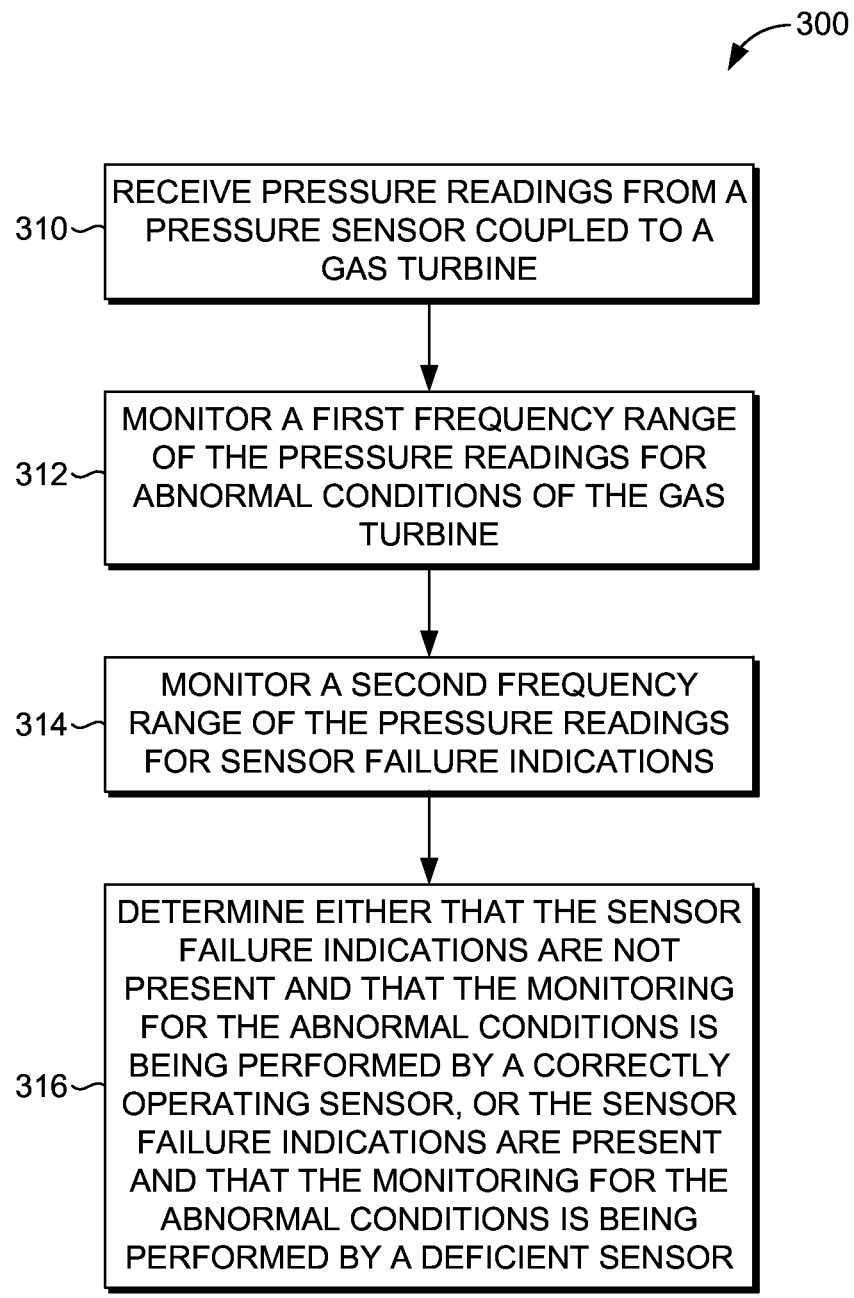
FIG. 3 is a block diagram of a first exemplary method for detecting deficient sensors in a gas turbine, in accordance with an embodiment of the present invention.

Referring now to FIG. 3, a block diagram of a first exemplary method 300 for detecting deficient pressure sensors in gas turbines is provided, in accordance with an embodiment of the present invention. At a first block 310, pressure readings, such as the pressure signal 204 shown in FIG. 2A, from a pressure sensor, such as the pressure sensor 106 shown in FIG. 1, coupled to a gas turbine, such as the gas turbine 102 shown in FIG. 1, are received.

At a second block 312, a first frequency range, such as the first frequency range 210 shown in FIGS. 2A-2C, of the pressure readings is monitored for abnormal conditions of the gas turbine, such as a predetermined spike in signal amplitude, a predetermined range of signal amplitudes, or another indication. At a third block 314, a second frequency range, such as the second frequency range 212 shown in FIGS. 2A-2C, of the pressure readings is monitored for sensor failure indications, such as a predetermined spike in signal amplitude, a predetermined range of signal amplitude, a relative difference in signal amplitude between the first frequency range and the second frequency range, or another indication that indicates that the pressure sensor is approaching failure and is in a deficient state.

At a fourth block 316, it is determined either that the sensor failure indications are not present and that the monitoring for the abnormal conditions is being performed by a correctly operating sensor, as shown in FIG. 2A, for example, or the sensor failure indications are present and that the monitoring for the abnormal conditions is being performed by a deficient sensor, as shown in FIG. 2B, for example.

Figure 4:
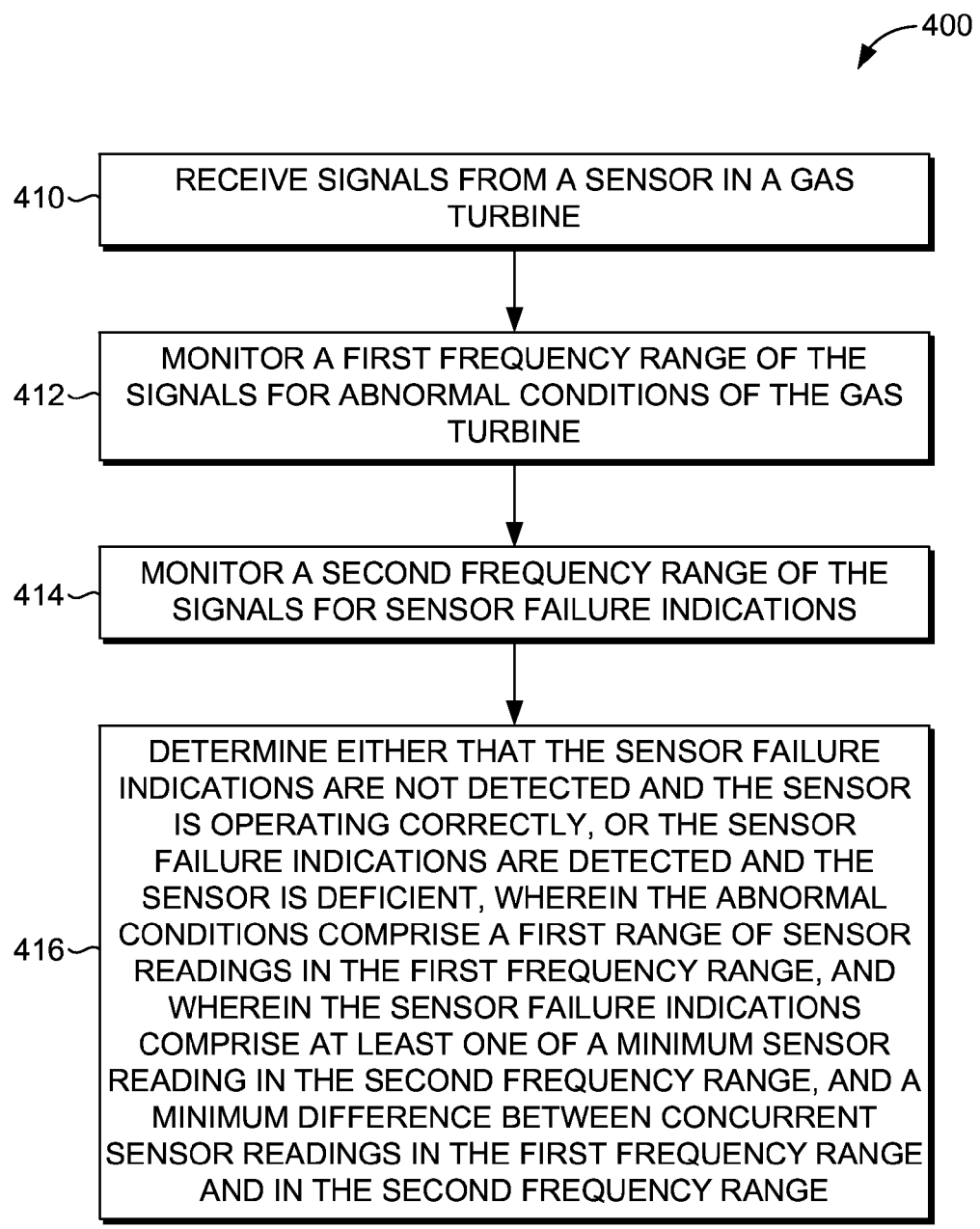
FIG. 4 is a block diagram of a second exemplary method for detecting deficient sensors in a gas turbine, in accordance with an embodiment of the present invention.

Referring now to FIG. 4, a block diagram 400 of a second exemplary method of detecting deficient sensors in gas turbines is provided, in accordance with an embodiment of the present invention. At a first block 410, signals, such as the pressure signal 204 shown in FIG. 2A, from a sensor, such as the sensor 106 shown in FIG. 1, in a gas turbine, such as the gas turbine 102 shown in FIG. 1, are received. At a second block 412, a first frequency range, such as the first frequency range 210 shown in FIGS. 2A-2C, of the signals is monitored for abnormal conditions of the gas turbine.

At a third block 414, a second frequency range, such as the second frequency range 212 shown in FIGS. 2A-2C, of the signals is monitored for sensor failure indications. At a fourth block 416, it is determined either that the sensor failure indications are not detected and the sensor is operating correctly, as shown in FIG. 2A, for example, or the sensor failure indications are detected and the sensor is deficient, as shown in FIG. 2B, for example. The abnormal conditions of the gas turbine may comprise a first range of sensor readings in the first frequency range, and the sensor failure indications may comprise at least one of a minimum sensor reading in the second frequency range, and a minimum difference between concurrent sensor readings in the first frequency range and in the second frequency range.

The first frequency range may have a predetermined first range of sensor readings, or signal amplitudes, at which an abnormal condition of the gas turbine is deemed to occur. The second frequency range may have a predetermined second range of sensor readings, or signal amplitudes, at which sensor failure indications are deemed to occur. The ranges may be actual ranges or just minimums (e.g., 10-20, or 10 to infinity). The frequency ranges may be distinct, may be spaced apart, or may overlap. Multiple frequency ranges may be monitored, as well. The first range of sensor readings and the second range of sensor readings may at least partially overlap each other. Alternatively, the ranges or minimum may be closely sequenced without overlap, or a monitoring gap between the first and second frequency ranges and/or the first and second sensor ranges may be utilized to further target a specific known abnormal reading. Once sensor failure indications have been detected, the control system may initiate a response. The response may include flagging or identifying an associated sensor, possibly for a specific time interval. Additionally, upon detecting a deficient sensor, the control system may ignore input from the associated sensor, may disable input from the sensor, and/or may provide an indication that the sensor is deficient.

Detecting that sensor failure indications have occurred may comprise determining that a first pressure signal amplitude from the first frequency range and a second pressure signal amplitude from the second frequency range are at least a predetermined difference, where the second pressure signal amplitude is greater than the first pressure signal amplitude. Additionally, the first frequency range may be at least 10 Hz on its lowest end, and the second frequency range may be at most 10 Hz on its upper end. Each of the first frequency range, the second frequency range, the first range of sensor readings, and the second range of sensor readings may be user-configurable. Monitoring of abnormal conditions of the gas turbine and sensor failure indications may occur simultaneously, alternately, concurrently, or separately. The system may further include one or more of the same sensors, such as pressure sensors, whose readings are monitored and/or compared by the control system.

Figure 5:
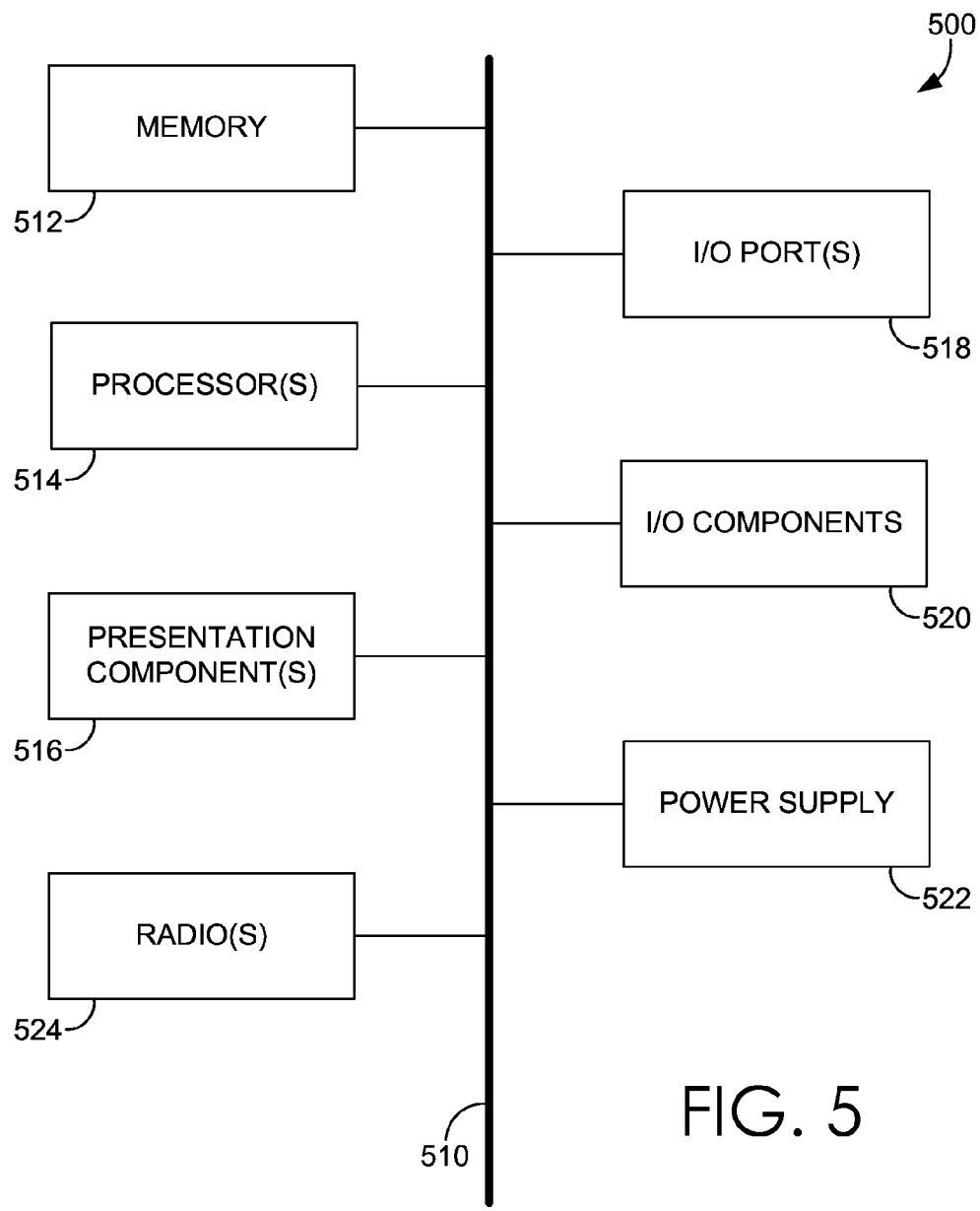
FIG. 5 is an exemplary computing environment which may be used with a control system of a gas turbine to detect deficient sensors, in accordance with an embodiment of the present invention.

Referring now to FIG. 5, an exemplary operating environment which can be used for implementing embodiments described herein is shown and designated generally as computing device 500. Computing device 500 is but one example of a suitable computing environment and is not intended to suggest any limitation as to the scope of use or functionality of the invention. The computing device 500 should not be interpreted as having any dependency or requirement relating to any one or a combination of components illustrated.

In FIG. 5, computing device 500 includes a bus 510 that directly or indirectly couples the following devices: memory 512, one or more processors 514, one or more presentation components 516, input/output (I/O) ports 518, input/output (I/O) components 520, and an illustrative power supply 522. Bus 510 represents what may be one or more busses (such as an address bus, data bus, or a combination thereof). Although the various blocks of FIG. 5 are shown with lines for the sake of clarity, in reality, delineating various components is not as clear, and metaphorically, the lines are blurred. For example, one may consider a presentation component such as a display device to be an I/O component. Also, processors have memory. The diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated as within the scope of FIG. 5 and when referencing the "computing device."

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in any variety of system configurations, including hand-held devices, consumer electronics, general-purpose computers, and more specialty computing devices, among others. The invention may also be practiced in distributed computing environments where tasks are performed by remote-processing devices that are linked through a communications network.

Computing device 500 may include a variety of computer-readable media and/or computer storage media. Computer-readable media may be any available media that can be accessed by computing device 500 and includes both volatile and non-volatile media, removable and non-removable media. By way of example and not limitation, computer-readable media may comprise computer storage media and communication media and/or devices. Computer storage media may include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. These memory components can store data momentarily, temporarily, or permanently. Computer storage media does not include signals per se.

Communication media typically embodies computer-readable instructions, data structures, or program modules. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer storage media in the form of volatile and/or non-volatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc. I/O ports 518 allow computing device 500 to be logically coupled to other devices including I/O components 520, some of which may be built-in. Illustrative components include a microphone, joystick, game pad, satellite dish, scanner, printer, wireless device, and the like.

Embodiments of the technology have been described herein to be illustrative rather than restrictive. Alternative embodiments will become apparent to readers of this disclosure. Further, alternative means of implementing the aforementioned elements and steps can be used without departing from the scope of the claims, as would be understood by one having ordinary skill in the art. Certain features and sub-combinations are of utility and may be employed without reference to other features and sub-combinations, and are contemplated as within the scope of the claims.

What is claimed is:

1. A computer-implemented method, executed by one or more processors, for detecting deficient sensors in gas turbines, the method comprising:
   receiving pressure readings from a pressure sensor coupled to a gas turbine;
   monitoring a first frequency range of the pressure readings for abnormal conditions of the gas turbine;
   monitoring a second frequency range of the pressure readings for sensor failure indications;
   determining either that:
      the sensor failure indications are not present and that the monitoring for the abnormal conditions is being performed by a correctly operating sensor, or
      the sensor failure indications are present and that the monitoring for the abnormal conditions is being performed by a deficient sensor, and
   detecting that the sensor failure indications have occurred, wherein detecting that the sensor failure indications have occurred comprises determining that a first pressure signal amplitude from the first frequency range and a second pressure signal amplitude from the second frequency range are at least a predetermined difference, and wherein the second pressure signal amplitude is greater than the first pressure signal amplitude.

2. The method of claim 1, wherein:
the abnormal conditions comprise a first range of sensor readings or a minimum sensor reading in the first frequency range, and
the sensor failure indications comprise a second range of sensor readings in the second frequency range.

3. The method of claim 2, wherein the first range of sensor readings and the second range of sensor readings are either:
at least partially overlapping; or
non-overlapping.

4. The method of claim 2, wherein the first frequency range, the second frequency range, the first range of sensor readings, and the second range of sensor readings are user-configurable.

5. The method of claim 1, wherein the abnormal conditions comprise a pressure spike above a predetermined minimum pressure reading.

6. The method of claim 1, wherein the first frequency range is higher than the second frequency range.

7. The method of claim 1, wherein upon detecting that the sensor failure indications have occurred, performing at least one of:
ignoring input from the pressure sensor;
disabling input from the pressure sensor; and
providing an indication that the pressure sensor is deficient.

8. The method of claim 1, wherein the first frequency range is at least 10 Hz on its lowest end, and wherein the second frequency range is at most 10 Hz on its upper end.

9. The method of claim 1, wherein monitoring for the abnormal conditions and monitoring for the sensor failure indications occurs concurrently.

10. One or more computer-readable media having computer executable instructions embodied thereon that, when executed, perform a method for detecting deficient sensors in gas turbines, the method comprising:
receiving signals from a pressure sensor in a gas turbine;
monitoring a first frequency range of the signals for abnormal conditions of the gas turbine;
monitoring a second frequency range of the signals for sensor failure indications; and
determining either that:
the sensor failure indications are not detected and the pressure sensor is operating correctly, or
the sensor failure indications are detected and the pressure sensor is deficient,
wherein the abnormal conditions comprise a first range of sensor readings in the first frequency range, and
wherein the sensor failure indications comprise at least one of:
a minimum sensor reading in the second frequency range, and
a minimum difference between concurrent sensor readings in the first frequency range and in the second frequency range;
wherein monitoring the first frequency range and monitoring the second frequency range comprises monitoring a signal amplitude in the respective frequency ranges; and
detecting that the sensor failure indications have occurred, wherein detecting that the sensor failure indications have occurred comprises determining that a first pressure signal amplitude from the first frequency range and a second pressure signal amplitude from the second frequency range are at least a predetermined difference, and wherein the second pressure signal amplitude is greater than the first pressure signal amplitude.

11. The media of claim 10, wherein the first frequency range is a minimum of 10 Hz at its lowest end, and wherein the second frequency range is a maximum of 10 Hz at its upper end.

12. The media of claim 10, wherein upon detecting that the sensor failure indications have occurred, performing at least one of:
ignoring input from the sensor;
disabling input from the sensor; and
providing an indication that the sensor is deficient.

13. A system for detecting deficient sensors in gas turbines, the system comprising:
a gas turbine having one or more combustors;
a control system communicatively coupled to the gas turbine; and
a pressure sensor coupled to the gas turbine and communicatively coupled to the control system, the pressure sensor sending signals to the control system;
wherein the control system is configured to:
monitor a first frequency range of the signals for abnormal conditions of the gas turbine;
monitor a second frequency range of the signals for sensor failure indications;
determine either that:
the sensor failure indications are not detected and the pressure sensor is operating correctly, or
the sensor failure indications are detected and the pressure sensor is deficient,
wherein the abnormal conditions comprise a first range of sensor readings in the first frequency range,
wherein the sensor failure indications comprise a second range of sensor readings in the second frequency range, and
wherein the first frequency range is higher than the second frequency range; and
detect that the sensor failure indications have occurred, wherein detecting that the sensor failure indications have occurred comprises determining that a first pressure signal amplitude from the first frequency range and a second pressure signal amplitude from the second frequency range are at least a predetermined difference, and wherein the second pressure signal amplitude is greater than the first pressure signal amplitude.

14. The system of claim 13, wherein the pressure sensor provides pressure readings to the control system, and wherein the control system monitors a relative difference between concurrently measured signal amplitudes from the pressure sensor in the first frequency range and in the second frequency range.

15. The system of claim 13, further comprising a plurality of pressure sensors coupled to the gas turbine, wherein the control system compares pressure readings received from the plurality of pressure sensors.

16. The system of claim 13, wherein:
the abnormal conditions comprise a minimum signal amplitude in the first frequency range, and
the sensor failure indications comprise a minimum signal amplitude in the second frequency range.

17. The system of claim 13, wherein the first frequency range is at least 10 Hz on its lowest end, and wherein the second frequency range is at most 10 Hz on its upper end.

* * * * *